Patented May 26, 1953

2,640,065

UNITED STATES PATENT OFFICE

2,640,065

PRODUCTION OF ORGANOSILANES

Siegfried Nitzsche, Burghausen, Oberbayern, and Egon Wiberg and Askan Hertwig, Seelze, Munich, Germany No Drawing. Application November 1, 1951, Serial No. 254,436. In Germany August 23, 1950

6 Claims. (Cl. 260—448.2)

The preparation of organosilicon halides by reaction of alkyl chlorides with silicon and by the reaction of silicon tetrachloride with Grignard reagents has heretofore been described.

The present invention relates to the preparation of organosilicon halides by new and improved methods.

In accordance with the present invention, a silicon subhalide is reacted at elevated temperature with a chlorohydrocarbon, preferably, but not necessarily, in the presence of a catalyst.

The silicon subhalides have heretofore been described (Robert Schwarz, "Angewandte Chemie," vol. 51, No. 22 (1938) pages 328 to 331). Those which are employed in the present process are solids and have a halogen content less than equivalent to $SiX_2$.

A wide variety of products may be prepared in accordance with the method hereof, depending upon the starting material. Thus, compounds such as methyl chloride, vinyl chloride, phenyl chloride, allyl chloride and the like, may be employed. By reaction of silicon subhalides with these materials, it is possible to obtain methylchlorosilanes, vinylchlorosilanes, phenylchlorosilanes and allylchlorosilanes, respectively. The present process accordingly has a much wider latitude of operability than does the process in which an alkyl or aryl chloride is reacted with elemental silicon.

The present process is conducted with the chlorohydrocarbon in fluid state, either in liquid or vapor phase. The reaction is preferably conducted in the presence of a catalyst. Suitable catalysts are the salts and oxides of heavy materials, for example, copper, which may be employed as copper oxide, as a copper salt or a mixture of the two. Likewise, metallic copper may be introduced and converted in situ to a salt or oxide. The process may likewise be conducted if desired in the presence of gases such as hydrogen, hydrogen halide or hydrocarbons, and the like.

The process may be readily performed by filling a reactor tube with the silicon subhalide and catalyst and passing the chlorinated hydrocarbon vapor through the tube at a temperature of 300° C. or above. The product which is withdrawn from the tube in vapor phase may be fractionated to recover the silanes so produced. Any unreacted chlorohydrocarbon may be returned to the reactor. In continuous operation of this variety, the chlorinated hydrocarbon may be present in either liquid or vapor phase. When a vapor phase type of reaction is conducted, pressure is employed on the reactor tube to maintain desired phase conditions.

Likewise, the present process may be conducted by a batch type of operation. Thus, the silicon subhalide may be loaded in a bomb or autoclave and the hydrocarbon halide introduced into the bomb or autoclave. When a hydrocarbon is employed which is normally a liquid, it may be loaded at atmospheric pressure. In case of volatile hydrocarbon halides it is frequency desirable to introduce these reactants into the bomb or autoclave under pressure. The bomb is then heated to reaction temperature and cooled. The liquid product may then be fractionated to recover the organochlorosilanes, or it may be employed directly for the preparation of siloxane resins by hydrolysis thereof.

The following examples illustrate the process hereof but should not be taken as limiting the scope of the present invention.

Example 1

Methyl chloride was continuously introduced at atmospheric pressure into a reactor containing silicon subchloride ($SiCl_{1.1}$). This silicon subchloride is a solid material. The reactor was maintained at a temperature of 320° C. The effluent product was condensed and found to contain methylchlorosilanes.

Example 2

The method of Example 1 was repeated, but employing ethyl chloride instead of methyl chloride. The condensed product was found to contain ethylchlorosilanes.

Example 3

Methyl chloride was introduced into a reactor for twelve hours at atmospheric pressure at a temperature of 330° C., which reactor contained 45 grams of $SiCl_{1.1}$ in mixture with 9.5 grams of pyrophoric copper. The effluent product was condensed, whereby there were obtained 70 cc. of liquid. This liquid product contained about 60 per cent of methylchlorosilanes.

Example 4

A reaction tube 120 cm. long was loaded with 4.5 grams of $SiCl_{1.1}$ mixed with 0.95 gram of pyrophoric copper. The reaction tube was heated to 350 C. Methyl chloride was introduced into the tube in vapor phase at a rate corresponding to one to two drops per second of liquid methyl chloride. The methyl chloride so introduced was diluted with an equal volume of hydrogen. After twelve hours 8 cc. of product had been collected. Of the methylchlorosilanes so collected, about half is methyltrichlorosilane and half dimethyldichlorosilane, although the mixture contains small percentages of silicon tetrachloride, trichlorosilane and trimethylchlorosilane.

That which is claimed is:

1. The method of preparing organosilicon compounds which comprises contacting a chlorohydrocarbon at a temperature above 300° C. with a solid silicon subchloride.

2. The method in accordance with claim 1 in which the hydrocarbon halide is in vapor phase during reaction.

3. The method in accordance with claim 1 in which the hydrocarbon halide is in liquid phase during reaction.

4. The method in accordance with claim 1 in which copper is present as a catalyst in the mixture with silicon chloride.

5. The method in accordance with claim 1 in which the reaction is conducted in the presence of hydrogen halide.

6. The method of preparing methylchlorosilanes comprising contacting methylchloride at a temperature above 300° C. with a solid silicon subchloride containing an average of less than 2 chlorine atoms per silicon atom.

SIEGFRIED NITZSCHE.
EGON WIBERG.
ASKAN HERTWIG.

References Cited in the file of this patent

UNITED STATES PATENTS

| Number | Name | Date |
|---|---|---|
| 2,560,355 | Lieber et al. | July 10, 1951 |
| 2,580,159 | DePree et al. | Dec. 25, 1951 |